United States Patent [19]

Haselwood et al.

[11] 4,025,851
[45] May 24, 1977

[54] AUTOMATIC MONITOR FOR PROGRAMS BROADCAST

[75] Inventors: Donald E. Haselwood, Clearwater; Carl M. Solar, Largo, both of Fla.

[73] Assignee: A.C. Nielsen Company, Northbrook, Ill.

[22] Filed: Nov. 28, 1975

[21] Appl. No.: 636,041

[52] U.S. Cl. .................................. 325/31; 325/54
[51] Int. Cl.² .......................................... H04J 9/00
[58] Field of Search ................ 325/31, 51, 53, 54, 325/64, 308; 343/200; 178/5.1, DIG. 13; 340/147 R, 147 A, 167 R

[56] References Cited
UNITED STATES PATENTS

| | | | |
|---|---|---|---|
| 3,733,430 | 5/1973 | Thompson et al. | 178/5.1 |
| 3,845,391 | 10/1974 | Crosby | 325/64 |
| 3,849,729 | 11/1974 | Baggem | 325/31 |
| 3,906,450 | 9/1975 | Prado, Jr. | 178/DIG. 13 |
| 3,947,624 | 3/1976 | Miyake | 178/DIG. 13 |

*Primary Examiner*—Benedict V. Safourek

[57] ABSTRACT

A system for automatically monitoring the programs broadcast by network affiliated broadcasting stations includes a plurality of remote monitoring sites and a central office for periodically interrogating the remote monitoring sites. Each remote monitoring site contains apparatus for monitoring time varying program identifying data, and for storing the data in a change format when the time varying data changes in an unexpected manner. An elapsed time clock in each remote monitoring unit generates a record of the elapsed time between the unexpected changes.

Each remote unit includes a minicomputer having a read-only memory and a random-access memory. The data in the read-only memory serves to establish communications with the central office and permits the central office to access the random-access memory. After the random-access memory has been accessed, it may be reprogrammed to alter the operation of the remote monitoring unit to accommodate different data formats or different information.

36 Claims, 9 Drawing Figures

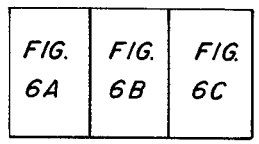
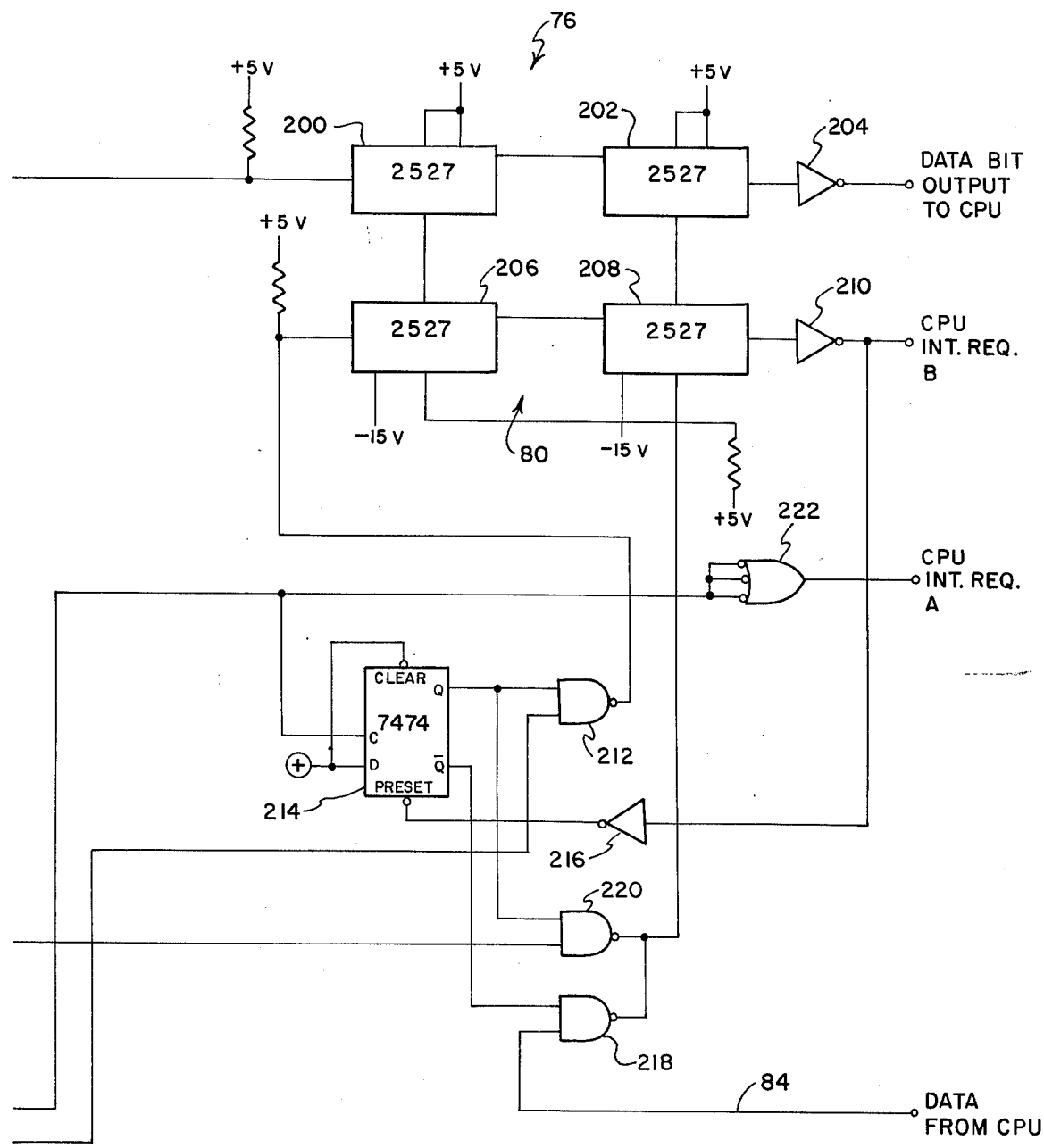

AUTOMATIC MONITOR FOR PROGRAMS BROADCAST

BACKGROUND OF THE INVENTION

A. Field of the Invention

This invention relates generally to monitoring systems, and more particularly to systems for automatically monitoring the programs broadcast by commercial television stations.

B. Description of the Prior Art

Several techniques for monitoring the programs broadcast by commercial television stations are known. The simplest technique involves a human monitor who watches the programs broadcast at a monitoring site and manually logs each program. Automated systems have been developed which employ a "picket fence" code placed in the upper corners of the picture broadcast by the television station which is automatically detected and recorded. Preferably the code is broadcast in such a manner that it is undetectable by the viewer. In prior art systems, this is accomplished by placing the code in a corner of the television field that is not normally visible to the viewer. In other systems, the code is placed in a notch that has been filtered out of the audio spectrum.

While these techniques provide a way to monitor the television programs broadcast by commercial television stations, registration problems occur when the bar code is recorded on a photographic medium, and when the code is placed in the audio spectrum, the code can be heard during quiet periods. Furthermore, these systems are generally used only to identify commercials, and are not particularly suitable for monitoring the programs carried by network affiliated television stations to determine whether a network program is being carried. This is because of the large amount of data involved in monitoring a network program line-up, and because no convenient data storage format has been developed to store this data. As a result, the effort required to monitor all of the network affiliated stations and to tabulate the data becomes excessive if more than minimal data about the programs broadcast is tabulated.

SUMMARY OF THE INVENTION

Accordingly, it is an object of the present invention to provide an improved monitoring system that overcomes many of the disadvantages of the prior art.

It is another object of the present invention to provide an automated system for monitoring the programs broadcast by commercial television stations.

It is another object of the present invention to provide an improved network monitoring system wherein each program generated by the network is encoded with data representing the program, and/or the source of origin and time of origin of the program to permit the programs to be subsequently identified at monitoring sites monitoring the network affiliates.

It is yet another object of the present invention to provide an automated monitoring system having a plurality of remote sites for monitoring and storing in a change type of format the program identifying data broadcast by the television stations and for automatically relaying the stored data together with an indication of the time duration of each program to a central location upon interrogation by a computer located at the central location.

It is still another object of the present invention to provide an automatic monitoring system having remotely located sites that are remotely reprogrammable from the central office.

Still another object is to provide a system for determining the viewing habits of home viewers by monitoring the network identification schedule.

In accordance with a preferred embodiment of the invention, each network originated program is coded with a data signal from which each program may be identified. This coded data signal may take the form of a code identifying the program itself, or the code may identify the source of the program and the time that the program originated to permit the program to be identified from the station logs. The encoding is done by placing binary data on line 20 or any other unused line in the vertical interval. The coded signal is applied to the network where it is received by the network affiliated stations for immediate or delayed broadcast.

A plurality of monitoring sites are disposed about the network coverage area to monitor the programs broadcast by the network affiliates. The monitoring may be done remotely by means of a monitor receiver that receives the programs broadcast by the network affiliates and recovers the data encoded on line 20. Alternatively, the monitoring unit may be installed on the premises of the network affiliate to monitor the program material applied to the transmitter. In the latter case, there is no need to transmit the data encoded on line 20, and the data may be stripped off by the monitoring unit before the signal is applied to the transmitter.

In either case, the data recovered from line 20 is stored at the remote location in a change format, that is, a format wherein the data is stored once, and new data is stored only when there is a change in the data. In addition, data indicative of the time interval between changes in data is stored. The time information permits delayed broadcasts to be identified since the real-time data will not correspond to the network time data in a delayed broadcast.

Each remote unit is periodically interrogated (usually once per day) via telephone line by a centrally located computer that controls a mini-computer located in each of the remotely located monitor units. Upon interrogation, the mini-computer causes the stored data to be transmitted in blocks to the central computer together with error checking data to permit the central computer to request the remotely located mini-computer to retransmit the data in the event that an error is found. In addition, each remotely located mini-computer may be reprogrammed by the central computer in the event that a modification of the data handling is desired. This is accomplished by providing each remotely located mini-computer with a hard-wired read-only memory (ROM) that initiates the data processing and transmission and a random-access memory (RAM) which may be reprogrammed by the central computer upon completion of the read-only memory routine.

DESCRIPTION OF THE DRAWINGS

The invention, and its method of operation, together with further objects and advantages thereof, will best be understood by reference to the following specification taken in connection with the accompanying drawings wherein:

FIGS. 6A, 6B, 6C and 6D comprise a circuit diagram of the decoder shown in block diagram form in FIG. 5.

DETAILED DESCRIPTION OF THE INVENTION

Figure 1:
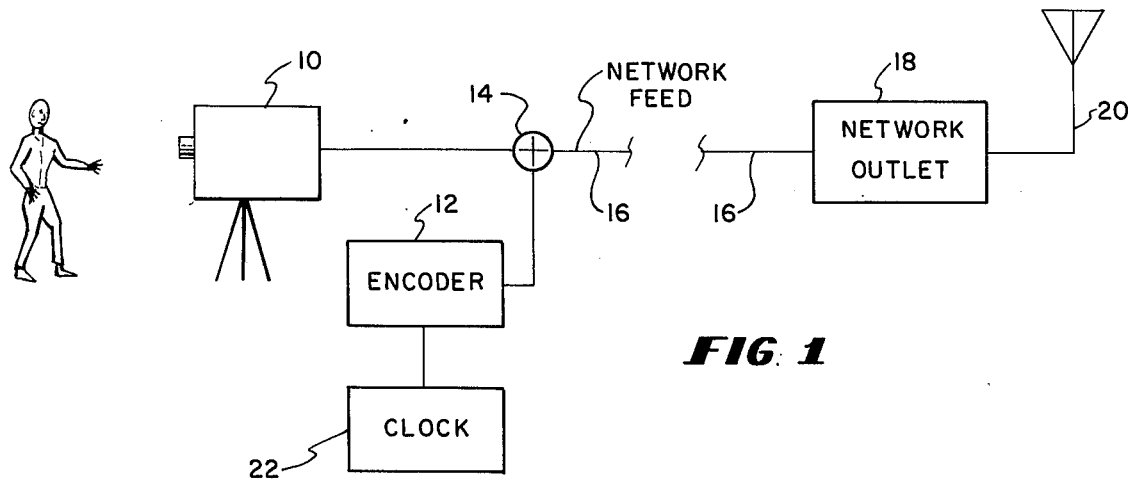
FIG. 1 is a block diagram showing a typical network outlet and the network source feeding the outlet.
Figure 4:
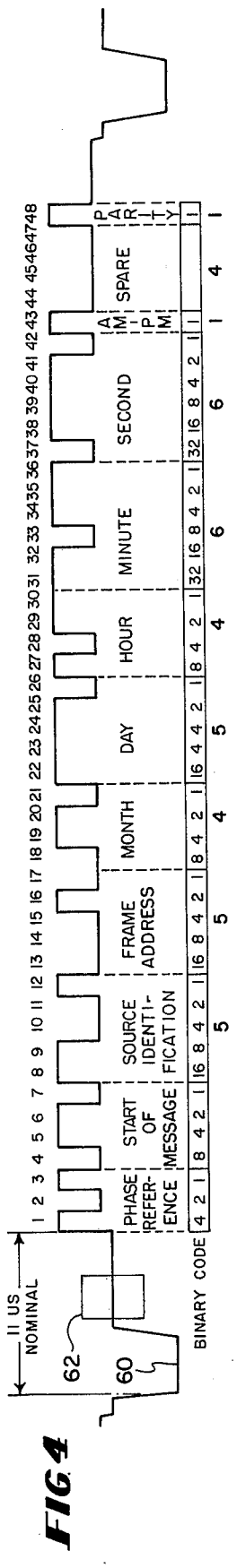
FIG. 4 is a representation of the program identifying data encoded on one of the lines of the vertical interval of the video signal.

Referring now to the drawings, with particular reference to FIG. 1, a network program originating from a television camera 10 or other source has its line 20 (the twentieth line) of field 1 (or other suitable line in the vertical retrace interval) coded with digital information by an encoder 12. The encoder 12 may be any suitable custom or commercially available encoder such as the Tektronix Model 1461 Signal Deleter/Inserter manufactured by Tektronix, Inc. The video information from the camera 10 is combined with the coding information from the encoder 12 at a mixing point 14 before the signal applied to a network feed line 16 which feeds all of the local network affiliates such as the network outlet 18 shown in FIG. 1. The signal received by the network outlet 18 may be applied directly to a transmitter (within the network outlet 18) for radiation by an antenna 20, or may be recorded (by a video recorder within the network outlet 18) for delayed broadcast. A clock 22 is connected to the encoder 12 to cause a real-time indicative signal to be encoded on line 20 of the video signal so that delayed broadcasts may be identified. In additiion, data identifying the source of the program and other information, including a reference phase signal, a start of message signal and parity bits are encoded on line 20. Also data identifying the program itself rather than, or in addition to, the program source identifying signal may be inserted. A typical format for the information encoded on line 20 is shown in FIG. 4.

Figure 2:
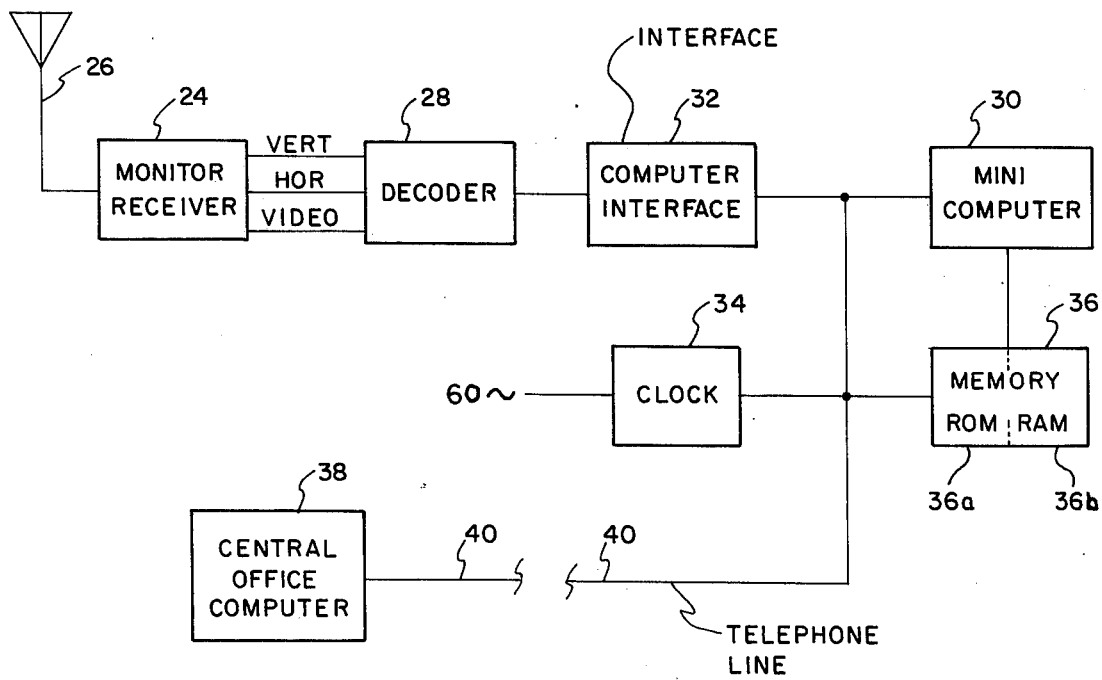
FIG. 2 is a block diagram illustrating one embodiment of the monitoring system according to the invention.

The broadcasts of the various network affiliates are monitored by monitoring stations located near each of the network affiliates. A typical monitoring station includes a monitor receiver 24 (FIG. 2) that is tuned to the frequency of one of the network affiliates, such as the network outlet 18, and receives the signals radiated by the network affiliate by means of an antenna 26. The monitor receiver 24 may be a specially designed receiver or a standard home receiver. The standard home receiver may even be a receiver in the home of a viewer if it is desired to monitor the viewing habits of typical viewers in addition to the programs broadcast. A decoder 28 is electrically coupled to the monitor receiver 24 and receives the horizontal and vertical synchronizing signals as well as the video signal from the monitor receiver 24. The decoder 28 processes the video signal under the control of the vertical and horizontal synchronizing signals and recovers the information encoded onto line 20 and applies the information thus recovered to a mini-computer 30 via a suitable computer interface 32. A clock 34 generates a time base for the mini-computer to provide an elapsed time indication, and a real-time clock in the central office computer 38 provides a time reference for the elapsed time reading generated by the clock 34. As a result, the time that a program was received and the duration of that program may be ascertained.

The decoded data together with the elapsed time from the clock 34 are stored in a memory 36, which contains a read-only memory 36a and a random-access memory 36b, under the control of the mini-computer 30. A central office computer is connected to each of the remotely located monitoring sites by means of a telephone line 40 and periodically (usually once a day, but more frequently, if necessary) interrogates each of the remotely located sites to retrieve the data stored in the memory 36. The telephone line 40 may be a leased line, or may form part of the telephone company long distance network.

In an alternative embodiment, if access to one of the network outlets 18 is available, the monitoring station may be placed directly on the premises of the local network outlet 18 and may be utilized to monitor the video signals applied to the transmitter of the network outlet 18. The advantage of locating the remote site directly on the premises of the network outlet 18 is that the effects of interference, signal fading and reflections in the transmission path between the network outlet 18 and the monitor receiver are eliminated.

Figure 3:
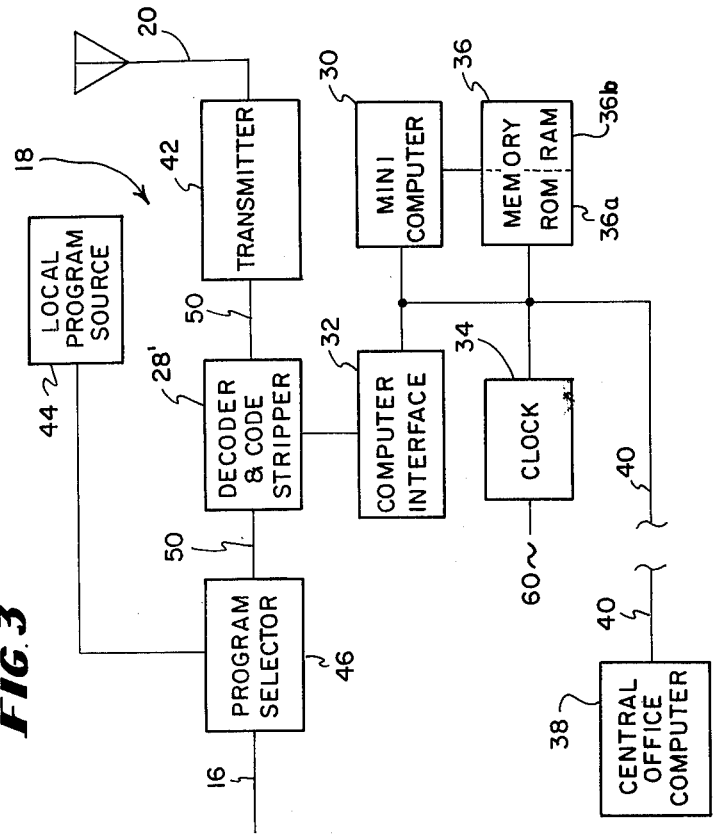
FIG. 3 is a block diagram of an alternate embodiment of the monitoring system according to the invention.

A typical television network outlet 18 (FIG. 3) includes a television transmitter 42 which feeds the antenna 20. Video information is applied to the transmitter 42 from the network feed line 16 or from a local program source 44. A program selector 46 is used selectively to connect the network feed line 16 or the program source 44 to the transmitter 42 so that either a network or a local program may be broadcast. The local program source 44 may be one of various program sources including a television camera for broadcasting live programs, a flying spot scanner for showing movies, or a video tape recorder for playing back video taped programs including network programs that had been previously taped for delayed broadcast. The output of the program selector 46 feeds a transmitter feed line 50 which applies the selected video program to the transmitter 42.

When the monitoring station is located on the premises of the network outlet 18, a decoder and code stripper 28', similar to the decoder 28 is interposed between the program selector 46 and the transmitter 42. The decoder and stripper 28' serves to retrive the code encoded on the line 20 and applies it to the computer interface 32 for application to the mini-computer 30. Since the code is detected at the network outlet site, prior to transmission, there is no need to transmit the line 20 code. Therefore, the decoder and code stripper 28' is provided with apparatus (such as the Tektronix Model 1461 Signal Deleter/Inserter previously described) for removing the coded data from the video signal before applying the video signal to the transmitter 42. The computer interface 32, the mini-computer 30, the clock 34, the memory 36 and the central office computer 38 may be identical to similarly designated apparatus illustrated in FIG. 2.

There are a variety of methods for encoding digital information onto a video signal. Among these are the use of subcarriers placed in nulls of the video signal spectrum, or placed in a portion of the audio spectrum that has been passed through a notch filter. Other systems include the use of alternate black and white vertical bars in the upper corners of the picture at a location where they would not ordinarily be visible on most television screens. Other systems encode one of the scanning lines, preferably the scanning located in the vertical interval. The last mentioned technique is the technique that has been chosen for use with the monitoring system according to the present invention.

The system according to the present invention encodes line 20 of field 1 with 48 bits of information. Line 20 of field 1 is within the vertical interval and does not appear on the viewing screen, and is therefore not visible in a properly adjusted television receiver. The choice of line 20, field 1 is not critical, and other lines in the vertical interval could also be coded.

Typical coding of a line in the vertical interval such as line 20 is illustrated in FIG. 4. The scanning line begins with a horizontal synchronizing pulse 60 followed by a 3.58 megacycle color burst 62, the latter being present when a color program is being broadcast. The synchronizing signal 60 and the color burst 62 are standard signals used in television broadcasting. The beginning of the data occurs approximately 11 microseconds following the beginning of the horizontal synchronizing pulse. The data includes forty-eight bits of information, each bit having a duration of approximately one microsecond. The bits are labelled 1 through 48 in FIG. 4 for purposes of identification. The first three bits of the sequence are alternating ones and zeros which provide a phase reference to the decoder 28 (or 28') to permit the decoder 28 (or 28') to decode the subsequent forty-five bits of the message. The next four bits following the phase reference signal comprise a start-of-message signal that indicates to the decoder 28 (or 28') that a message is about to follow. The particular sequence of ones and zeros in the start of message of signal is chosen so that it is not likely to be confused with a phase reference signal having errors or with noise and video information. The next five bits 8–12 indicate the source of the program. The five bits 13–17 comprise a frame address, i.e., a number ranging from 0 to 29 assigned to each of the 30 frames broadcast each second. Bits 18–43 identifying the time that the program originated at the network, with bits 18–21 identifying the month, bits 22–26 the day, bits 27–30 the hour, bits 31–36 the minute, bits 37–42 the second and bit 43 indicating a.m. or p.m. Bits 45–47 are spare bits which may be used for any desired purpose, and bit 48 is a parity bit used for error checking. As an illustrative example, the waveform shown in FIG. 4 is coded with a phase reference 101, a start-of-message code 0110, a source identification code 11001 (indicating Public Broadcasting System, Location 1), a frame address 02, month 06, date 30, 11:55 p.m.

The specific format of the data described above is not critical, and other suitable data formats may be used. The format may be modified as required to accommodate the particular data to be tabulated. The modifications to the data format illustrated in FIG. 4 may take the form of changes in the number of bits allocated to each item of information to be transmitted, the order in which the various items are transmitted or even the type of data to be transmitted. For example, in the embodiment illustrated in FIG. 4, a broadcast program is identified by the source identification code (bits 8–12) and the time of origin (bits 18–43) serving to identify the program. Alternatively, a unique program identifying code can be generated for identifying each program, and used instead of or in addition to the time and source identification code; however, the use of a time and source identification code rather than a unique program identifying code for each program has the advantage that it simplifies encoding because the source identification code need not be changed each time there is a program change, and the program may be readily identified by examining the time log of the originating station.

In order to decode the information on line 20, line 20 must first be identified by the system. This may be done by providing logic in the system that can locate line 20 by detecting the vertical synchronizing pulse from a television set and counting horizontal synchronizing pulses following the detection of a vertical synchronizing pulse to locate line 20. This technique has several disadvantages because the vertical synchronizing pulse from a television set may not occur precisely at line 1, and the processing amplifiers used in most television stations to resynchronize the television signals may be off by one or more lines due to misadjustment, thereby changing the time relationship between the vertical synchronizing pulse and line 20. In addition, hardware must be provided to determine whether the field is an odd or an even field because the code will be present only in field 1.

As a result, the system according to the present invention processes several lines following the detection of a vertical synchronizing pulse and examines each one of the lines for the presence of a code. Sufficient storage is provided so that up to six lines may be examined for the presence of a code, particularly for the presence of a start-of-message code which will always be present regardless of the information contained in the code.

Figure 5:
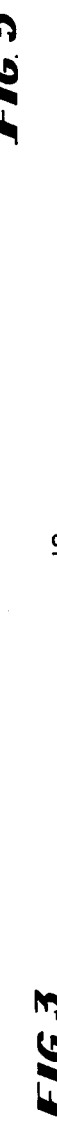
FIG. 5 is a more detailed block diagram of the decoder illustrated in FIG. 2.
Figure 5:
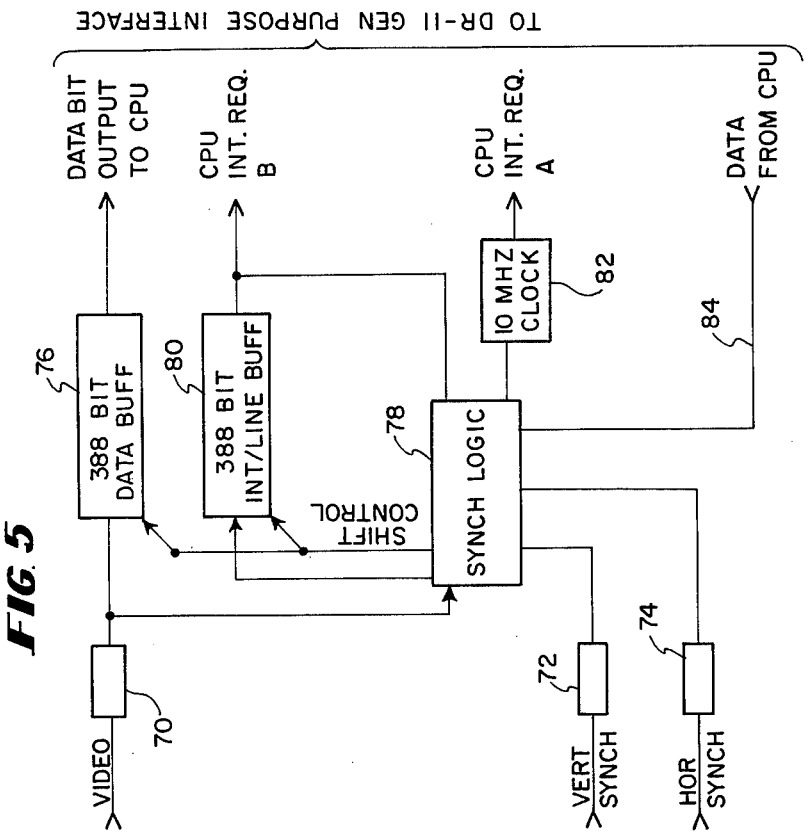

The data recovery hardware (FIG. 5) utilizes a video processing amplifier 70 for recovering the data from the video signal. The amplifier 70 is connected to any suitable video stage of the monitor receiver 24 where the level of the video signal is compatible with the input level requirements of the amplifier 70. Vertical and horizontal synchronizing signal amplifiers 72 and 74 are connected to the respective vertical and horizontal synchronizing circuits (not shown) of the monitor receiver 24 for receiving vertical and horizontal synchronizing signals. The output of the video processing amplifier 70 is connected to a 388-bit data buffer 76 which stores the data received from the video processing amplifier 70. The capacity of the buffer 76 is sufficient to store data corresponding to slightly more than six lines. The outputs of the vertical and horizontal synchronizing amplifiers 72 and 74 are applied to a synchronizing logic circuit 78 which controls the loading of the video data into the buffer 76 and also applies horizontal synchronizing pulses to a second 388-bit buffer 80. The synchronizing logic circuit is controlled by a 10 megahertz clock that operates at a frequency of ten times the bit rate. The output of the vertical synchronizing amplifier 72 causes an interrupt request to be applied to the mini-computer 30, as does each horizontal synchronizing signal stored in the buffer 80. Accordingly, an interrupt occurs following each vertical synchronizing signal and after each horizontal synchronizing signal stored in the buffer 80. Following each interrupt, a byte of data corresponding to one line of information is read into the mini-computer 30. During this process, the contents of the data buffer 76 and the synchronizing buffer 80 are shifted through the respective buffers under the control of the synchronizing logic circuit 78. Each time a new horizontal synchronizing signal is shifted out of the buffer 80, a new interrupt request is generated to cause the next byte of data to be read out from the buffer 76. The process continues until the last horizontal synchronizing pulse is shifted out of the buffer 80. During the read out process, the mini-computer 30 applies a signal to a line 84 which causes the synchronizing logic circuit 78 to prevent further horizontal synchronizing pulses from being applied to the buffer 80 during the read out process.

Figure 6A:
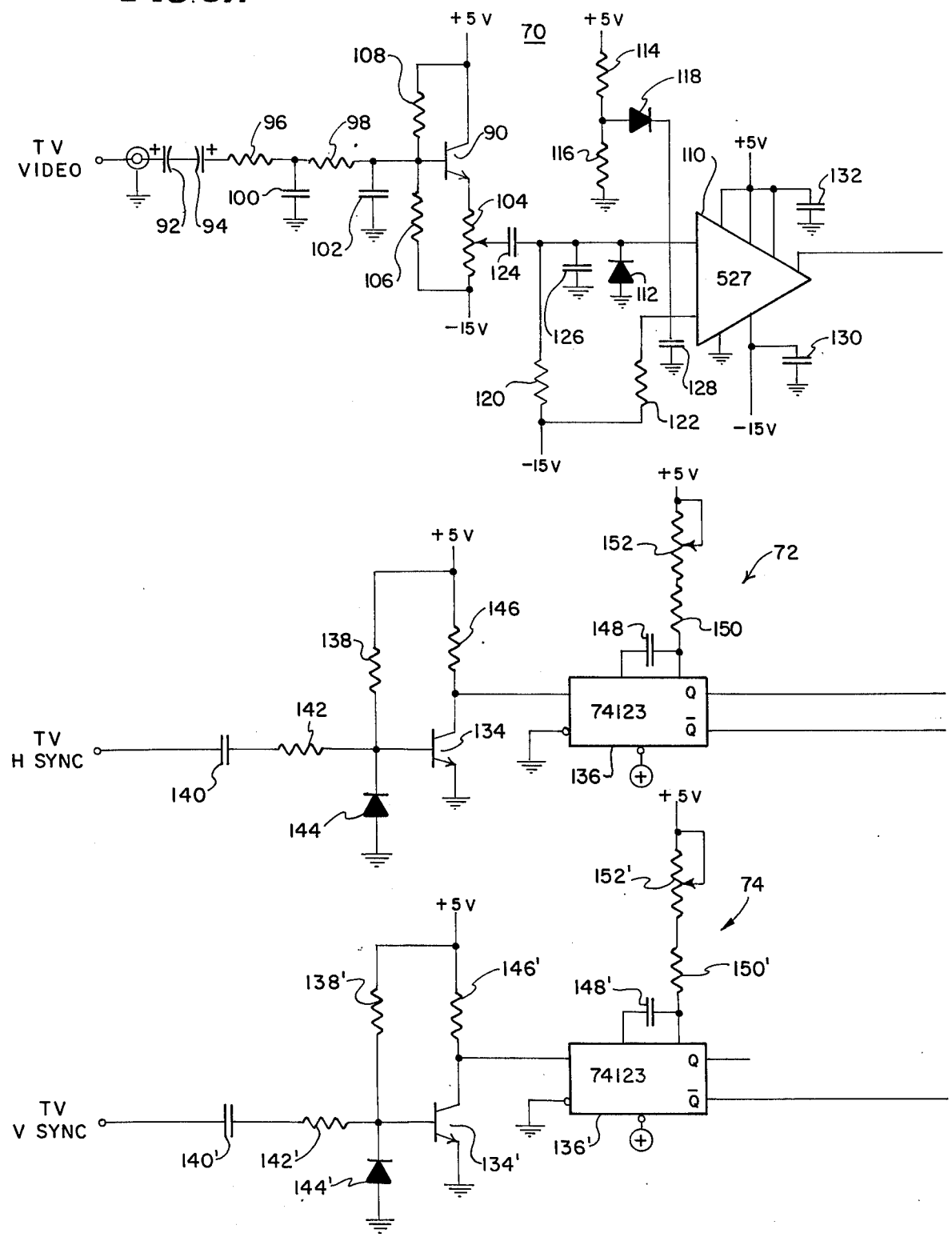

The video processing amplifier 70 (FIG. 6A) comprises a video amplifier transistor 90 that is coupled to one of the video stages of the receiver 24 via a pair of oppositely poled electrolytic coupling capacitors 92 and 94 and by a two-stage low-pass filter comprising a pair of resistors 96 and 98 and a pair of capacitors 100 and 102. The low-pass filter has a high frequency cutoff point that is selected to pass the data encoded on line 20, and to remove video signal components having frequencies above the frequency spectrum of the encoded data. The capacitors 92 and 94 serve to direct current isolate the transistor 90 from the monitor receiver 24.

The transistor 90 is connected as an emitter follower having a potentiometer 104 as the emitter load and a pair of biasing resistors 106 and 108. The potentiometer 104 serves as a video gain control for signals applied to a comparator 110 which amplifies and limits the amplitude of the video signal from the transistor 90.

The comparator 110 comprises an amplifier operated as a comparator having a threshold set at the amplitude center of the data. A diode 112 clamps the negative peaks of the synchronizing signals to ground, and a pair of resistors 114 and 116 determine the slicing or threshold level of the comparator 110. A diode 118 connecting the junction of the resistors 114 and 116 to one of the inputs of the comparator 110 serves to compensate for the temperature variations of the diode 112. A pair of resistors 120 and 122 bias the inputs of the comparator 110. A coupling capacitor 124 couples the output signal from the potentiometer 104 to one of the inputs of the comparator 110, and capacitors 126, 128, 130 and 132 serve to bypass the input terminals and power supply terminals of the comparator 110.

The horizontal synchronizing circuit 72 includes an amplifier transistor 134 and a monostable multivibrator 136. The transistor 134 is biased in a normally conductive mode by a resistor 138, and periodically rendered nonconductive by negative peaks of the horizontal synchronizing signal from the receiver 24. Horizontal synchronizing signals are applied to the base of the transistor 134 via a coupling network including a capacitor 140 and a resistor 142. The negative peaks of the input signal are clamped to ground by a diode 144 which protects the base to emitter junction of the transistor 134 from reverse polarity voltages.

The output of the transistor 134 obtained at the junction of the collector of the transistor 134 and a collector load resistor 146 is applied to the input of the monostable multivibrator 136. The monostable multivibrator 136 is responsive to the horizontal synchronizing pulses from the transistor 134 and generates a positive going fixed duration pulse at its Q output and a negative going fixed duration pulse at its $\overline{Q}$ output in response to each horizontal synchronizing signal. The duration of the positive and negative going pulses is determined by a capacitor 148, a resistor 150 and a potentiometer 152.

The operation of the vertical synchronizing circuit 74 is similar to that of the horizontal synchronizing circuit 72. The vertical synchronizing circuit includes an amplifier transistor 134' and a monostable multivibrator 136'. Other components of the vertical synchronizing circuit 74 are similar to corresponding components of the horizontal synchronizing circuit 72. Consequently, similar components of the horizontal and vertical synchronizing circuits 72 and 74 are designated by like numbers, with the components of the circuit 74 being designated by primed numbers. Because of the lower frequency of operation of the vertical synchronizing circuit 74, the time constant determined by the capacitor 148', the resistor 150' and the potentiometer 152' is longer than the time constant of the corresponding capacitor 148, resistor 150 and potentiometer 152 to provide a longer duration output pulse at the output of the monostable multivibrator 136'.

Figure 6B:
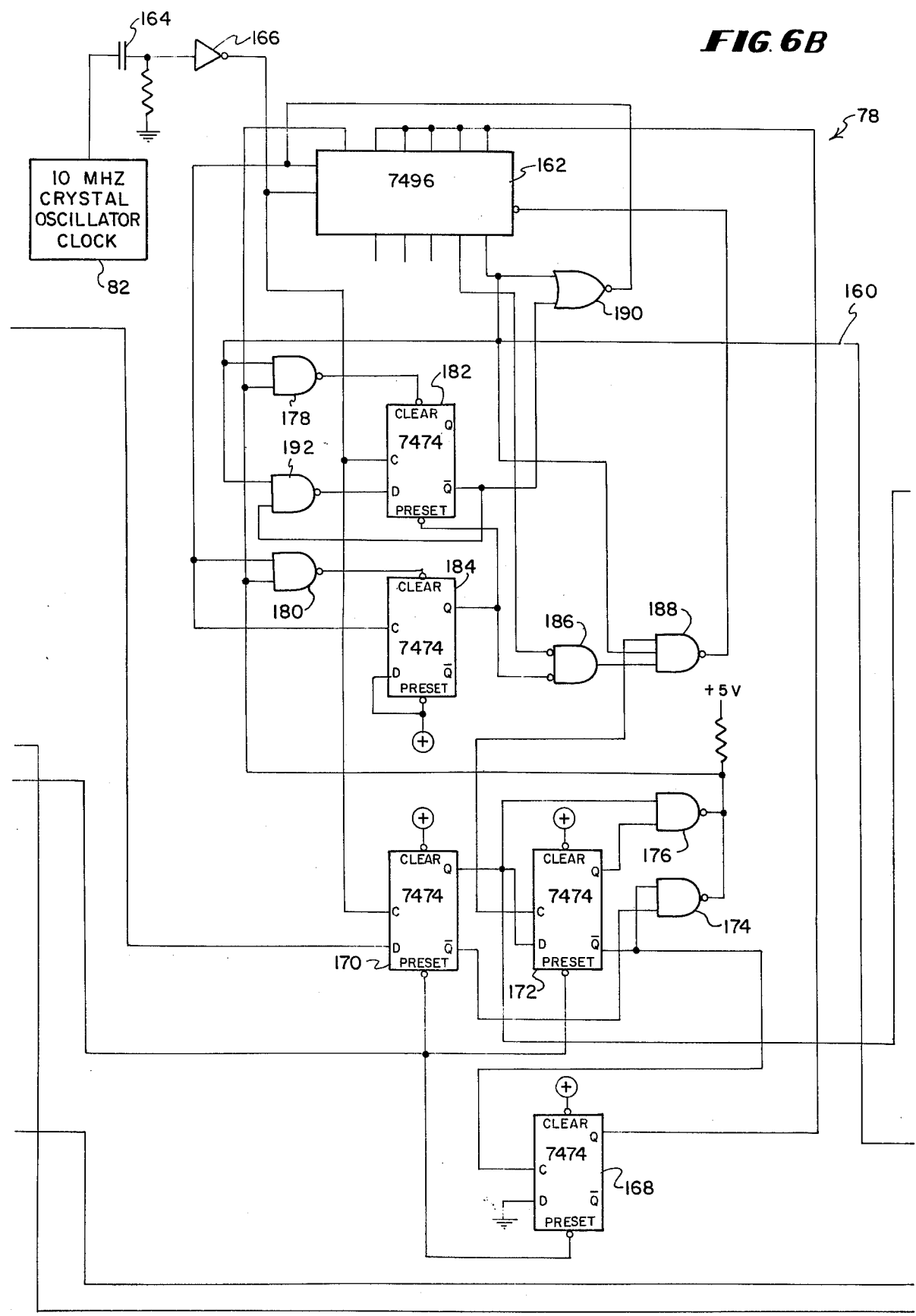

In order to decode the data present on line 20, the synchronizing logic circuit 78 (FIG. 6B) must provide a clocking strobe pulse to a line 160 at the center of each data bit interval. These clocking strobe pulses must be synchronized to the data stream in order for decoding to take place. The clocking strobe is generated by the 10MHz clock 82 which, in this embodiment, is a 10MHz crystal controlled oscillator. The clock 82 drives a variable modulo counter 162 which has a nominal modulo of 10 but which can have its modulo adjusted to maintain the synchronizing clock pulses in synchronism with the received data bits. A coupling capacitor 164 and an inverter 166 are used to couple the 10 MHz signal from the oscillator 82 to the variable modulo counter.

In a preferred embodiment, the counter 162 is a "Johnson counter" fabricated from a five-stage shift register such as a shift register type SN 7496 manufactured by Texas Instruments, Inc. The Johnsom counter has the advantage that it can be operated at higher speed than conventional counters and requires fewer stages than a ring counter. For example, the modulus of the Johnson counter can be set to 2N or 2N−1, where N is the number of stages comprising the shift register. This allows a counter having a modulus of 9 or 10 to be fabricated from a five-stage shift register. The operation of such a counter is described in application bulletin APP. 85/3 entitled "Micrologic Shift Counters" published November 1966 by Fairchild Semiconductor Div. of Mountain View, California.

Operation of the synchronizing logic circuit 78 is initiated at each horizontal line by the $\overline{Q}$ output of the multivibrator 136 which sets a bistable multivibrator 168. The multivibrator 168 applies a signal to the counter 162 to preset each state of a counter 162 to a one after the first zero to one transition from the inverter 166 following the termination of the horizontal synchronizing pulse from the multivibrator 136. After five counts from the oscillator 82 (½ of a data interval), the first usable clock strobe occurs on line 160 in approximately correct phase with the data. The bistable multivibrator 168 is reset on the next input clock pulse from the oscillator 82 applied to its input via a pair of bistable multivibrators 170 and 172.

A two-stage shift register comprising the pair of bistable multivibrators 170 and 172 and a pair of NAND gates 174 and 176 form a transition circuit which provides a transition pulse that is approximately 100 nanoseconds wide and occurs zero to 100 nanoseconds after a transition in the video data. The transition signal is applied to the counter 162 and to a pair of NAND gates 178 and 180 which control a late flip-flop 182 and an early flip-flop 184, respectively. If the transition signal occurs during the first half period of the strobe on line 160, the early flip-flop 184 is set. When the count in the counter 162 reaches a count of nine (one count before the normal strobe time), the counter 162 is reset by a signal from the early flip-flop 184 applied to the reset terminal of the counter 162 via respective NOR and NAND gates 186 and 188, thereby causing the strobe to be ten percent early. If the transition occurs during the second half of the data strobe period, the late flip-flop 182 is turned on by the output of the gate 178. The late flip-flop 182 remains on one count longer than the signal on the line 160, thereby maintaining a high state signal on a NOR gate 190 and delaying the input to the first stage of the counter 162 by one count, thereby delaying the following strobe by ten percent. The above action is repeated following each transition in the data to cause the counter to divide the output signal from the clock 82 either by nine or eleven depending on the phase of the transition. When no data transitions occur, the counter divides by ten, thus maintaining the strobe approximately in phase with the input data. The late counter 182 is reset by a NAND gate 192 if the strobe signal is early on the subsequent strobe pulse.

The video data from the comparator 110 is clocked by the flip-flop 170 under the control of the clock 82 and applied to the data storage circuit 76 (FIG. 6C) which comprises a 256-bit shift register 200 and a 132-bit shift register 202 to provide 388 bits of storage. The output of the shift register 202 is applied to the mini-computer 30 via the interface 32 and an inverter 204. The horizontal synchronizing storage circuit 80 is similar to the circuit 76 and includes a 256-bit shift register 206, a 132-bit shift register 208 and an inverter 210. Horizontal synchronizing pulses are applied to the input of the shift register 206 via a NAND gate 212. The NAND gate 212 is enabled by a flip-flop 214 which is triggered by the trailing edge of the vertical synchronizing pulse. As a result, horizontal synchronizing pulses are sampled at a one megacycle rate and applied to the shift register 206 and subsequently shifted through the shift register 208 to provide an interrupt signal to the mini-computer each time a horizontal pulse is shifted through. The horizontal synchronizing pulse at the output of the inverter 210 resets the flip-flop 214 via an inverter 216 to prevent further horizontal synchronizing pulses from being applied to the synchronizing signal storage register 80 once the first horizontal synchronizing pulse has been shifted through. The horizontal synchronizing pulses present in the registers 206 and 208 are shifted through on a bit-by-bit basis by the mini-computer 30 which applies a pulse to a line 84 each time a bit of data is received by the mini-computer 30. The pulse applied to the line 84 is inverted by a gate 218 which was enabled when the flip-flop 214 was reset, and causes each of the shift registers 200, 202, 206 and 208 to be shifted one bit each time a pulse is received. Consequently, the contents of the data registers 200 and 202 are shifted into the mini-computer 30 simultaneously with the contents of the horizontal synchronizing signal registers 205 and 208 until the last horizontal synchronizing pulse present in the registers 206 and 208 is applied to the computer. At this point, no further interrupts are generated by the inverter 210, and no further data is read into or read out of the data storage registers until the receipt of the next vertical synchronizing pulse which again sets the flip-flop 214 thereby enabling a gate 220 to cause the gate 220 to strobe the registers 200, 202, 206 and 208 to load further video and horizontal synchronizing signals into the storage circuits 76 and 78. Simultaneously, the vertical synchronizing circuit is inverted by a gate 222 which generates an interrupt signal to the computer to cause the computer 30 again to sample the outputs of the inverters 204 and 210 for video and horizontal synchronizing data.

The mini-computer 30 is programmed to look for valid data at the output of the 388-bit shift register 76. In the present embodiment, the mini-computer 30 is a PDP 11 mini-computer manufactured by Digital Equipment Corporation of Maynard, Massachusetts; however, other mini-computers or micro-computers having sufficient speed and capacity may be used. The mini-computer 30 is programmed in a language called MACRO which is described in a programmer's manual entitled "DEC-11-LASMA-A-D,DOS/BATCH MACRO ASSEMBLER" published by Digital Equipment Corporation.

Each time the mini-computer 30 receives an interrupt signal from the inverter 210 or the gate 222 via the interface 32, the computer looks for valid data at the output of the inverter 204. Briefly describing the steps of the program in which the mini-computer 30 looks for valid data, all parameters within the mini-computer 30 are first initialized upon receipt of an interrupt request. After the parameters have been initialized, the mini-computer 30 processes a small range of lines about line 20 where data is expected. After a predetermined group of lines have been selected, the first few bits at the beginning of each line are ignored since they may contain portions of the horizontal synchronizing signal 60, the color burst signal 62, or the phase reference signal (FIG. 4). After ignoring the first few bits of each line, the computer looks for the start-of-message pattern (bits 4–7 of FIG. 4). If the start-of-message signal is not found after five bits, then it is assumed that the line does not contain valid data. If the start-of-message signal is found, the remainder of the line is analyzed for data. The mini-computer 30 then sends pulses to the shift registers 78 and 80 via the line 84, as previously described, to clear the bits out of the registers 76 and 80 and continues to send pulses until an interrupt request is received from the inverter 210 or the gate 222 indicating the start of the next line, or until each of the 388 bits present in each register has been shifted through one of the respective shift registers 76 and 80.

Several checks are performed on the data contained in line 20 to determine if the data is valid. For example, the frame address (bits 13–17 of FIG. 4) should run consecutively from 0 through 29 and repeat. If a predetermined number of consecutive frame addresses are received, the mini-computer 30 will indicate that a coded program is being received. In the present embodiment, the number of consecutive frame addresses necessary to indicate a coded signal is set by a console switch (not shown) on the mini-computer 30. Random frame addresses indicate a no code status.

After it has been determined that a coded condition exists, several checks are made on the data to determine whether the data is logical. This is accomplished by grouping the data bits from line 20 into bytes and checking to determine whether the data in each byte is logical. The bytes indicating time, i.e., day, hour, minute, second are checked for logic. For example, data indicating 65 minutes, 25 hours or 13 months would not be logical, thus indicating an error. Finally, a parity check is made of the data. While these checks are being made, the data received from the shift register 76 is buffered within the mini-computer 30 so that the data can be processed before the next line of raw data is received.

After the various checks have been made, the data is compressed into a change line format and stored in the memory 36. The change line format is a modified version of the change line format described in U.S. Pat. Nos. 3,651,471 and 3,742,463, incorporated herein by reference. In the change line format described in the above-referenced patents, new data is stored each time any change occurs in the received data. If no change occurs, no new data is stored. The data sampled in the present system includes data bits that are continuously changing, such as time and frame address bits, together with program identification bits that change only when the program changes or when the broadcast station switches from a network to a local program, that is, from a coded to an uncoded transmission. Accordingly, in order to conserve storage space, a new entry is made into the memory only when a change occurs in the program code (i.e., program identification or source identification code), or when a transition is made between a coded and an uncoded transmission.

Although the time and frame addresses are constantly changing, in the present embodiment, the changes in time and frame addresses are not normally stored if they do not depart from their expected values. For example, the time is stored only when the received time differs from the time calculated by adding the last stored time and the time that has elapsed since the detected time was last stored. This serves to identify a delayed broadcast, and also compensates for drift between the elapsed time clock 34 (FIGS. 2 and 3) and the encoding clock 22 (FIG. 1). As long as the received time equals the expected time calculated from the elapsed time, no time entry is made, and the elapsed time clock is allowed to continue to run. Whenever there is a discrepancy, the item causing the discrepancy is stored, and the elapsed time clock is reset.

In the present embodiment, the source identification code and the time code are transmitted only on frames 2 and 3 to permit other data to be transmitted during the other frames if desired, but a frame address is transmitted with each frame. The frame addresses transmitted with each frame permit a code/no code determination to be made without monitoring the data on frames 2 and 3. The coded or uncoded status is determined by monitoring the frame addresses broadcast with each frame and checking to determine if the frame addresses run consecutively. If enough of the frame addresses are out of sequence, a no code status is recorded. The monitoring of the frame address sequence provides an accurate way to determine the existence of a coded or an uncoded status, and eliminates the erroneous entry of a no code status that could occur if only frames 2 and 3 were examined for the presence of a code. This is because it can be still determined from the examination of the frame addresses that a coded condition exists even if line 20 of frame 2 or 3 is obliterated by noise. Because programs do not normally change each frame, if line 20 of frame 2 or 3 is obliterated, the logic of the system assumes no change in the program has occurred and that the received time is the same as the time calculated from the elapsed time clock 34. If a change has indeed occurred, the change is detected one second later when frames 2 and 3 are again transmitted. Such a system is preferable to a system that would erroneously indicate a no code status in the event that the data broadcast on lines 2 and 3 were accidentally obliterated by noise or other phenomenon.

The actual time of occurrence of each transmission and each change is calculated by the central office computer 38 which interrogates the remote units. The computer 38 contains a real-time clock and dialing and interface equipment for establishing communication with the remote sites. Equipment similar to the equipment contained in the central unit 44 described in the references U.S. Pat. No. 3,651,471 and in U.S. Pat. Nos. 3,742,462 and 3,772,649 also incorporated herein by reference, may be used in the computer 38 to provide the remote interrogation function. The actual time of each change is calculated at the time the remote location is interrogated by transmitting the stored change line data to the central office computer 38 in a reverse time direction, that is, the last received data being transmitted first. Afterward, the elapsed time between changes and the time required to transmit the data from the mini-computer 30 to the central office computer 38 is subtracted from the real time generated at the central office computer 38 to provide an indication of the actual time that the program was broadcast by the network outlet. The time indicative bits received from the network outlet are recorded each time a change occurs to provide an indication of the time that the program originated from the program source. This provides a way to identify delayed broadcasts, because whenever a delayed broadcast occurs, the calculated time of broadcast will not match the recorded time or origin encoded on line 20.

In order to make the system more flexible and to make it compatible with various data coding formats, and also to make it compatible with various central office and data transmission hardware, the mini-computer 30 is remotely programmable by the central office computer 38. The remote programming or "bootstrapping" feature is accomplished by providing the mini-computer 30 with a random-access memory (RAM) 36b and a small read-only memory (ROM) 36a that utilizes one or more standard integrated circuit read-only memories such as the SN 54187 manufactured by Texas Instruments, Inc. The ROM contains a minimal program (hardware bootstrap) that will do the following:

a. Answer an incoming call, i.e., to latch up the telephone line and connect a data coupler thereto;

b. Send an interval of dotting (alternate ones and zeros) to permit the central office computer 38 to bit synchronize;

c. Send a series of start-of-message characters to the central office computer 38;

d. Receive a program from the central computer 38, and after performing checks on the received data (e.g., parity and check sums) load the program into the mini-computer 30 and transfer control to the program just loaded.

The mini-computer 30 is also provided with a time out timer that returns control to the ROM program if the time out limit is reached before the timer is reset by the software program loaded into the mini-computer 30. This causes control to revert to the ROM 36a in the event of a fault in the software program or in the event of a power failure, noise, or a hardware failure in the remote site. This permits the mini-computer 30 to be reprogrammed by the central computer 38 in the event of a power or other failure. When such a remote programming feature is provided, the entire system may be reprogrammed overnight from the central computer thereby obviating the need for sending a service man or programmer to reprogram each site when a program change is necessary.

When the remote site is interrogated by the central office computer 38, if the remote site is in the bootstrap mode, the remote site will send the dotting sequence for approximately seven seconds followed by 256 words of start-of-message characters. The multiple start-of-message characters indicate to the central office computer 38 that the remote site is in the bootstrap mode, and cause the central office computer 38 to send a program to the remote site. The above-described sequence of events occurs the first time the remote site is programmed, or in the event that the remote site has "crashed" as a result of a power failure or for any other reason.

In the normal mode of operation, a program has already been loaded into the mini-computer 30, and upon receipt of a call from the central office computer 38, the mini-computer answers and sends a seven second sequence of alternate ones and zeros (dotting) to bit synchronize the central office computer 38 followed by a dummy block of data. The dummy block of data may be any arbitrary sequence of ones and zeros, provided that it does not contain a multiplicity of start-of-message characters, because such a multiplicity of start-of-message characters would be interpreted by the central office computer 38 as meaning that the remote site is in the bootstrap mode and cause the central office computer 38 to load a new program into the remote site computer 30.

Upon receipt of the dummy data sequence, the central office computer 38 sends a block of data to the mini-computer 30. The data sent by the central office computer 38 is normally a request for the computer 30 to send data; however, it may be a code requesting the remote site to crash so that a new program may be loaded into the remote site. If the central office computer 38 has requested that the mini-computer 30 send data, the change line data stored in the memory is sent, starting with the block of data containing the most recent entry. Subsequent data blocks move backwards in time, with the next most recently stored data entry being sent next until the memory 36 is emptied, or until a data block that had already been sent during a previous transmission is reached. Each data block is checked by the central office computer 38 for accuracy, the accuracy checks including parity checks and logical checks similar to those previously described. If an error is detected, the mini-computer 30 is instructed to retransmit the previously transmitted block of data, and the data is rechecked for accuracy.

After each block of data has been verified and found to be accurate, the central office computer 38 instructs the mini-computer 30 to transmit the next block of data, and the sequence is repeated until the memory 36 has been emptied or until repetitious data, as previously described, is transmitted. In the preferred embodiment, the data is transmitted in blocks with 512 8-bit bytes being transmitted per block. The 512 byte block length was chosen as providing a good compromise between transmission accuracy and speed. A longer block length would reduce the probability of each block being accurately transmitted and received, and a shorter block length would result in unnecessary segmenting of the data, thereby reducing transmission speed without substantially increasing transmission accuracy. The transmission of data by the mini-computer 30 is controlled by the steps described at pages 17–36 of the attached program.

The capacity of the memory 36 is chosen such that each site need be interrogated only once per day. Since a typical remote site experiences approximately 150 changes per day, each change requiring approximately 17 bits of storage, the nominal capacity of the memory 36 must be sufficient to contain this change information. In unusually active sites, the site may be interrogated more frequently.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A system for automatically monitoring the programs broadcast by a broadcasting system having a first source of programs, with at least some of the programs from the first source of programs being identified by a time varying code, and a plurality of broadcasting stations for selectively broadcasting programs from said first source or from another source, said system comprising:
    means for detecting the time varying code identifying each code identified program broadcast by predetermined ones of said broadcasting stations;
    means responsive to the time varying code detected by said detecting means at a predetermined time for generating a second code indicative of the predicted value of said time varying code at a subsequent time;
    means coupled to said detecting means for storing representations of the time varying codes detected by said detecting means;
    means for comparing said second code and said detected time varying code at said subsequent time and for rendering said storing means operative to store said detected code only if said detected time varying code differs from said second code by a predetermined amount; and
    means remotely located from said storing means for periodically retrieving said representations stored in said storing means.

2. A system as recited in claim 1 wherein said code detecting means includes means for detecting a program code uniquely identifying the program broadcast.

3. A system as recited in claim 1 wherein said code detecting means includes means for detecting a source code identifying the source of origin of the program and for detecting a time code indicating the time of origin of the program.

4. A system as recited in claim 1 further including change responsive means coupled to said detecting means and to said storing means, said change responsive means being responsive to predetermined changes in said detected time varying code for rendering said storing means operative to store representations of the detected time varying codes only upon the occurrence of said predetermined changes in said code.

5. A system as recited in claim 4 wherein said time varying code includes a time indicative code, said system including an elapsed time clock, means for calculating a time value in response to one value of said time indicative code and said elapsed time clock, and means for comparing each value of said time indicative code with said time value, said change responsive means being responsive to difference between said time value and said time indicative code for rendering said storing means operative to store representations of said time indicative code only when said time value differs from said time indicative code by a predetermined amount.

6. A system as recited in claim 4 wherein said time varying code includes representations of numbers occurring in a predetermined sequence, said change responsive means being responsive to said second code and said representations of numbers for rendering said storing means operative to store a first indication when less than a predetermined number of said representation of numbers correspond to said second code, and to store a second indication when a predetermined number of said representations of numbers correspond to said second code.

7. A system as recited in claim 6 wherein said representations of numbers correspond to successive frame addresses, said successive frame addresses each being incremented by one unit, said storing means being operative to store a no-code status when fewer than a predetermined number of said frame addresses are sequentially incremented by one unit, and for storing a code status when at least said predetermined number of frame addresses are incremented by one unit.

8. A system as recited in claim 4 wherein said change responsive means is nonresponsive to changes in said code other than said predetermined changes, and wherein said system includes means for determining and storing in said storing means the time interval between said predetermined changes.

9. A system as recited in claim 8 wherein said change responsive means includes means responsive to the absence of a detected code, said absence responsive means being operative to render said time interval determining and storing means operative to determine and store the time duration of an absence of a detected code.

10. A system as recited in claim 1 wherein said detecting means includes detecting apparatus directly connected to each of said predetermined ones of said broadcasting stations for detecting the code identifying the programs broadcast.

11. A system as recited in claim 10 wherein said detecting means includes a plurality of detecting apparatus, each detecting apparatus being associated with one of said predetermined ones of said broadcasting stations, and wherein said storing means includes a plurality of memories, each memory being associated with one of said detecting apparatus, each of said memories and said detecting apparatus being colocated with the associated one of said broadcasting stations.

12. A system as recited in claim 1 further including a plurality of receivers, wherein each of said receivers is located within the broadcasting range of an associated one of said predetermined ones of said broadcasting stations and is operative to receive the programs broadcast thereby, and wherein each of said receivers is connected to said detecting means for providing programs received from the associated one of said broadcasting stations thereto. said detecting means being operative to detect the codes identifying the received programs.

13. A system as recited in claim 12 wherein said receivers are standard broadcast television receivers located in the homes of television viewers.

14. A system as recited in claim 12 wherein said detecting means includes a plurality of detecting apparatus, each detecting apparatus being connected to an associated one of said receivers, and said storing means includes a plurality of memories, each memory being associated with one of said detecting apparatus, each of said memories and said detecting apparatus being colocated with the associated ones of said receivers.

15. A system for automatically monitoring the programs broadcast by a broadcasting network having a common source of programs, wherein some of the programs are identified by a code, and a plurality of broadcasting stations adapted selectively to broadcast programs from the common source and from a local source, said system comprising:

a plurality of remote monitoring units each associated with a predetermined one of said broadcasting stations, each remote monitoring unit including means for detecting the code identifying the programs broadcast by the broadcasting station associated therewith, each remote unit further including means for storing representations of the codes detected by said detecting means; and a central office unit including means for selectively communicating with each of said remote units and for retrieving the representations stored in each of said storing means, said remote units each including a reprogrammable memory programmed to render said remote unit operative to identify the programs broadcast and to store said representions, said selective communicating means including means for remotely reprogramming said memory for altering one of the identifying and storing operations of said remote unit.

16. A system as recited in claim 15 wherein said detecting means includes means for decoding data encoded on one of the lines in the vertical blanking interval of a video signal.

17. A system as recited in claim 16 wherein each of said storing means includes means for storing said representations only upon the occurrence of predetermined changes in successively detected codes.

18. A system as recited in claim 17 wherein said storing means includes means for storing only changes that differ from an expected change.

19. A system as recited in claim 17 wherein each of said remote units includes means for measuring and recording the time interval between each of said predetermined changes.

20. A system as recited in claim 15 wherein said reprogrammable memory includes a read-only memory and a random-access memory, each random access memory being responsive to said central office unit for altering the operation of one of said remote monitoring units.

21. A system as recited in claim 15 wherein each of said remote monitoring units includes means coupled to said read-only memory for establishing communication between said central office unit and one of said remote monitoring units.

22. The method of identifying coded broadcasts made of network affiliated broadcasting stations comprising the steps of:

periodically detecting a time varying code that changes in an expected manner associated with the coded broadcasts;

comparing predetermined portions of successively-detected codes;

storing a representation of the last detected code upon the occurrence of a change in the predetermined portion thereof that differs from an expected change;

providing indications of the time elapsed between the storage of successive representations; and storing said indications.

23. The method recited in claim 22 wherein said predetermined portion further includes data from which the identity of the broadcast program may be ascertained and wherein the representation of the last-detected code is stored when the data from the last-detected code differs from corresponding data of the previous code.

24. The method recited in claim 22 wherein said predetermined portion includes data representative of the time of origin of the broadcast program further including the steps of:

automatically calculating a continuously varying time value from the last stored time representative data and from the indication representing the time elapsed since the storage of the last stored code;

comparing the most recent time value with the most recently detected time representative data; and storing the most recently detected time representative data when the most recently detected time representative data differs from the most recent time value by a predetermined amount.

25. The method recited in claim 22 wherein said code includes data that varies in a predetermined sequence further comprising the steps of:

providing indications representative of the predetermined sequence;

comparing the indications of the predetermined sequence with the predetermined sequence of data in said code; and providing a coded signal indicative signal only when a predetermined portion of the sequence in said code corresponds to the indication of the predetermined sequence.

26. A system for automatically monitoring the programs broadcast by a broadcasting network having a source of programs, wherein some of the programs are identified by a time varying code, and a plurality of broadcasting stations adapted to broadcast programs from the source, said system comprising; a remote monitoring unit associated with one of said broadcasting stations, said remote unit including means for detecting the code identifying the program broadcast by the associated broadcasting station, means for determining expected changes in said time varying code and means responsive to said detecting means and said expected change determining means for storing representations of the codes detected by said detecting means in response to predetermined unexpected changes in said detected code that differ from said expected changes.

27. A system as recited in claim 26 further including means for decoding data encoded on one of the lines of the vertical blanking interval, wherein said storing means includes a memory unit and change responsive means coupled to said detecting means and to said memory unit, said change responsive means being responsive to said predetermined unexpected changes in said detected code for rendering said storing means operative to store representations of the detected codes in said memory unit only upon the occurrence of said predetermined unexpected changes in said code, said change responsive means being nonresponsive to changes in said code other than to said predetermined unexpected changes, and wherein said system further includes means for determining and storing in said memory unit the time interval between said predetermined unexpected changes.

28. A system as recited in claim 27 wherein said memory unit includes a read-only memory and a random-access memory, said random-access memory being reprogrammable for altering the operation of said remote monitoring unit.

29. A system as recited in claim 27 wherein said time varying code includes a time indicative code having time varying values and said time interval determining means includes an elapsed time clock, said system including means for calculating a time value in response to one value of said time indicative code and said elapsed time clock, and means for comparing each value of said time indicative code with said time value, said change responsive means being responsive to difference between said time value and said time indicative code for rendering said storing means operative to store representations of said time indicative code when said time value differs from said time indicative code by a predetermined amount.

30. A system as recited in claim 29 wherein said time varying code includes representations of numbers occurring in a predetermined sequence, said change responsive means being responsive to said number sequence representative code for rendering said storing means operative to store a first representation when less than a predetermined number of said number sequence representations correspond to said predetermined sequence, and to store a second representation when a predetermined number of said number sequence representations correspond to said predetermined number sequence.

31. A system as recited in claim 30 wherein said number sequence representations correspond to successive frame addresses, said successive frame addresses each being incremented by one unit, said storing means being operative to store a no-code status when fewer than a predetermined number of said frame addresses are sequentially incremented by one unit, and for storing a code status when at least said predetermined number of frame addresses are incremented by one unit.

32. A system as recited in claim 27 wherein said change responsive means includes means responsive to the absence of a detected time varying code, said absence responsive means being operative to render said time interval determining and storing means operative to determine and store the time duration of an absence of said detected time varying code.

33. A system as recited in claim 26 wherein said detecting means includes detecting apparatus directly connected to said broadcasting station for detecting the time varying code identifying the programs broadcast.

34. A system as recited in claim 33 wherein said directly connecting means includes means for preventing the broadcast of said code by said time varying broadcasting station.

35. A system as recited in claim 26 further including a receiver located within the broadcasting range of said one broadcasting station operative to receive the programs broadcast thereby, and wherein said receiver is connected to said detecting means for providing programs received from said broadcasting stations thereto, said detecting means being operative to detect the time varying codes identifying the received programs.

36. A system as recited in claim 35 wherein said receiver is a standard broadcast television receiver located in the home of a television viewer.

* * * * *